United States Patent [19]

Lange et al.

[11] 3,926,650
[45] Dec. 16, 1975

[54] FOAMING AGENT FOR PLASTER AND CEMENT COMPOSITIONS

[75] Inventors: Jost Lange, Naurod; Gerhart Schneider, Frankfurt am Main; Albert Zeh, Niederwalluf, all of Germany

[73] Assignee: Hoechst Aktiengesellschaft, Germany

[22] Filed: Feb. 26, 1974

[21] Appl. No.: 445,980

Related U.S. Application Data

[63] Continuation-in-part of Ser. No. 199,302, Nov. 16, 1971, abandoned.

[30] Foreign Application Priority Data

Nov. 16, 1970 Germany............................ 2056255

[52] U.S. Cl. ..................... 106/90; 106/97; 106/111
[51] Int. Cl.² ........................................... C04B 7/02
[58] Field of Search ............ 106/87, 88, 90, 97, 111

[56] References Cited
UNITED STATES PATENTS

| | | |
|---|---|---|
| 2,318,574 | 5/1943 | Harter et al. ....................... 106/111 |
| 2,442,321 | 5/1948 | Cuppett ............................... 106/87 |
| 3,287,145 | 11/1966 | Fischer ............................... 106/90 |
| 3,317,327 | 5/1967 | Matsuda et al. ....................... 106/90 |
| 3,661,603 | 5/1972 | Nicol ................................... 106/90 |
| 3,782,983 | 1/1974 | Komor ................................. 106/90 |

*Primary Examiner*—J. Poer
*Attorney, Agent, or Firm*—James E. Bryan

[57] ABSTRACT

This invention relates to a foamable composition comprising water, calcined gypsum or hydraulic cement and, as a foaming agent, the sodium salt of an α-olefin sulfonate of an olefin having 14 to 20 carbon atoms in the molecule, or the sodium salt of the sulfuric acid ester of an alkyl polyglycol ether, which ether is prepared by hydroxyethylation of one mole of a fatty alcohol having a carbon chain of 10 to 14 carbon atoms with, on the average, 3 moles of ethylene oxide, or a mixture of both of the said sodium salts.

2 Claims, No Drawings

FOAMING AGENT FOR PLASTER AND CEMENT COMPOSITIONS

This application is a continuation-in-part of application Ser. No. 199,302, filed Nov. 16, 1971, now abandoned.

This invention relates to the production of foamed compositions of Plaster of Paris or cement with the use of certain interfacially active substances, and furthermore to foaming agents for this purpose as well as to foamable mortar mixtures.

It is known to produce cellular concrete of other porous shaped bodies from cement or other hydraulic binders with the addition of water, foaming agents and optionally of stabilizers, as well as optionally of other additives. The foaming agents play an important part therein. Upon their selection substantially depends how effectively the hydraulic binders can be processed into a foam. According to German Pat. No. 1,059,336, the foaming agents used are reaction products of cation-active and anion-active compounds. But their efficiency is unsatisfactory, particularly for the production of porous insulating compositions of plaster. In the production of cement-containing mortar compositions, foaming agents have not displayed any noticeable effect hitherto. Because of the high content of calcium ions to be found in aqueous compositions of calcined gypsum (hemihydrate) or cement, it hardly could be expected, however, to find foaming agents of a better efficiency for such compositions.

Among the multitude of surface-active agents, there are also known the olefin sulfonates; they have been exclusively used in detergents. For the same purpose and for foam baths, shampoos and the like, there is also used, for example, the sodium salt of sulfuric esters of fatty alkyl polyglycol ethers.

It has now been found that (a) α-olefin sulfonates or (b) alkali, ammonium or ethanolamine salts of sulfuric esters of hydroxyalkylated alcohols or hydroxyalkylated alkyl phenols or mixtures of (a) and (b) can be used in an unexpectedly advantageous manner as foaming agents in the production of foamed compositions by the incorporation of air or another gas into a composition of Plaster of Paris or cement into which water has been stirred.

The α-olefin sulfonates to be used in accordance with the invention are technical products which are produced from α-olefins with 10 to 20 carbon atoms in the molecule, usually from a mixture of such olefins, according to known processes by sulfonation, e.g. by reaction with sulfur trioxide, and subsequent hydrolysis and neutralization. The so-called α-olefin sulfonates thus may be water-soluble salts of olefin monosulfonic acids, olefin disulfonic acids, hydroxyalkane monosulfonic acids or hydroxyalkane disulfonic acids. The cation of the α-olefin sulfonates usually is sodium but also the other alkali metal salts and the ammonium salts, as well as other water-soluble may be used.

The hydroxyalkylated alcohols indicated above under (b) are alcohols with 10 to 18 carbon atoms which are oxalkylated with 1 to 4 moles of alkylene oxide. Preferably, it is an oxalkylation with ethylene oxide but also propylene oxide or butylene oxide may be used as the oxalkylation means.

The hydroxyalkylated alkyl phenols indicated above under (b) are alkyl phenols with 8 to 14 carbon atoms in the alkyl group which are oxalkylated with 1 to 6 moles of alkylene oxide. The oxalkylation agent preferably is ethylene oxide but also may be propylene oxide or butylene oxide.

The base of the salts mentioned above under (b) may be sodium, potassium, ammonium, or mono-, di- or triethanolamine.

0.01 to 1 part by weight of the foaming agents to be used in accordance with the invention is usually required per 100 parts by weight of calcined gypsum or of dry mortar of plaster or of cement mortar. Occasionally, there are used larger quantities of foaming agents, up to about 5 parts by weight per 100 parts by weight of calcined gypsum, mortar of plaster or cement mortar.

If necessary for the particular use, it is possible to use foam stabilizers. The following substances have proved particularly efficient as stabilizers: N-methyltaurides of higher fatty acids (10 to 18 carbon atoms in the molecule); fatty alcohols with 10 to 18 carbon atoms in the molecule: fatty acid alkylolamides, such as mono- or diethanolamides of fatty acids; salts of fatty acids with 16 to 18 carbon atoms in the molecule;

amine oxides and phosphine oxides, such as dimethylamine oxide or dimethylphosphine oxide of coconut oil acid, having the general formula
R — N(CH$_3$)$_2$ = O or R — P(CH$_3$)$_2$ = O;

ampholytes, such as the sodium salt of N-dimethyl-coconut oil acid - acetic acid or sulfobetaines;

phosphoric acid esters of long-chain alcohols (10 to 18 carbon atoms in the molecule) or of alcohols with 8 to 10 carbon atoms in the molecule which have been oxethylated with 1 to 4 moles of ethylene oxide; and alkyl phenols or hydroxyalkyl phenols with alkyl chains of 10 to 18 carbon atoms.

A very interesting field of application of the foaming agents to be used in accordance with the invention is the production of plastered cardboard sheets and partition walls of plaster, which preferably are porous in order to save weight or for better heat and sound insulation. In their production, the use of 0.01 of 1 part by weight of α-olefin sulfonate per 100 parts by weight of calcined gypsum (hemihydrate) has proved advantageous. For the preparation of the plaster composition, about 60 to 80 parts by weight of water are required. A better foaming capacity is surprisingly achieved, however, by the joint use of α-olefin sulfonate and the salts of sulfuric acid esters mentioned above under (b). In order to facilitate rapid and uniform distribution of the foaming agents in the aqueous plaster composition, the foaming agents preferably are employed in the form of 30 to 50 per cent aqueous solutions. Such aqueous solutions advantageously contain 5 to 50 parts by weight of α-olefin sulfonate,
10 to 70 parts by weight of sulfuric acid ester salt and, per 100 parts by weight of foaming agent solution,
0 to 35 parts by weight of foam stabilizer, and
0 to 20 parts by weight of glycol.

In the above formulation, the optionally used glycol serves as an antifreeze; it prevents the aqueous solution from separating out any component at low temperatures. The glycol may be, for example, ethylene glycol, propylene glycol, butylene glycol or one of the corresponding diglycols or triglycols and any other glycol suitable as an anti-freeze.

In accordance with the invention, the α-olefin sulfonates also may be used very advantageously in the production of plastering compositions of calcined gypsum or of cement mortar. In addition to calcined gypsum or cement and the foaming agent, the plastering mortar compositions generally contain further additives such as hydrated lime (slaked lime), ground limestone, quartz sand and expanded silicates (e.g. expanded perlite, foliated vermiculite or asbestos fibers).

In accordance with the invention, the mortars of plaster or of cement contain 0.01 to 1 part by weight of $\alpha$-olefin sulfonate and 0 to 0.35 part by weight of foam stabilizer per 100 parts by weight of dry mortar composition. The foam stabilizers used advantageously are fatty acid methyltaurides, fatty alcohols with 10 to 18 carbon atoms in the molecule, or other anion-active or non-ionogenic pulverizable tensides.

If retarded elimination of water is desired, the mortar composition may contain 0.05 to 0.4 part by weight of methyl cellulose, particularly suitable being methyl cellulose, a 2 per cent aqueous solution of which has a viscosity of 1,000 to 30,000 cp. at 20°C. Mortars of plaster preferably contain, per 100 parts by weight of calcined gypsum, 0.01 to 0.5 part by weight of a plaster setting retarder, e.g. of a polyvalent organic oxyacid, such as citric acid or tartaric acid.

The dry mortar of plaster usually has the following known composition:
- 40 to 100 parts by weight of calcined gypsum,
- 0 to 20 parts by weight of hydrated lime,
- 0 to 60 parts by weight of limestone sand and/or quartz sand, and
- 0 to 5 parts by weight of expanded silicates.

Cement mortars provided in accordance with the invention with $\alpha$-olefin sulfonates prove very advantageous, for example, as plastering mortars for mechanical applications. The mortar is introduced in the dry state into the plastering machine in which a stream of the dry mixture is continuously mixed wth the desired quantity of water within a very short time, and the wet plastering composition obtained is pumped through a tube to a spraying nozzle by means of which the wet plastering composition forced out is directed to the surface to be plastered. Mixing the water with the dry mortar unavoidably causes the incorporation of air into the mixture and the use of the foaming agent, in accordance with the invention, results in permanent foaming of the plastered composition.

The dry cement mortar usually has the following known composition:
- 50 to 200 parts by weight of cement,
- 25 to 200 parts by weight of hydrated lime,
- 400 to 900 parts by weight of limestone sand and/or quartz sand, and
- 0 to 10 parts by weight of expanded silicates.

If its water-retention capacity is to be improved, the above cement mortar additionally contains
- 0.5 to 5.0 parts by weight of methyl cellulose.

Another interesting use of the foaming agents in accordance with the invention is in the production of compositions foamed by means of a gas and comprising a cement-containing composition stirred with water, in which case the incorporation of the gas is effected by the use of a cement-containing composition stirred with water and containing a gas-generating composition. In this procedure, the use of the foaming agents is particularly advantageous for the production of cellular concrete and light-weight lime sandstone. Both building materials principally have the same constituents, viz. sand, lime, and portland cement to which aluminum powder is added in the dry state. When adding about 0.1 per cent of aluminum powder, calculated on the weight of the total dry mixture, a mixture for cellular concrete is obtained; when adding less, a mixture for light-weight lime sandstones is obtained. The production of the porous building materials is performed in a manner such that, simultaneously with the wetting of the mixtures with water, foaming of the compositions occurs in that the aluminum powder reacts with the hydrate of lime, with calcium aluminate and hydrogen gas being obtained therefrom. The latter is responsible for the swelling and foaming of the building material which is subsequently dried and hardened by steam.

When used in accordance with the invention, the $\alpha$-olefin sulfonates are distinguished by their high foaming capacity. They permit the production of many very stable small air voids even at very high degrees of water hardness of the aqueous compositions. Furthermore, they have the advantage that they are not hygroscopic in the dry powder form and are very readily soluble in water. Further advantages are known in their use for the production of plastering compositions. The dry plastering compositions are very rapidly wetted with water when stirred therewith so that the aqueous plastering composition is soon completely mixed. Furthermore, the plastering mortars prepared in accordance with the invention, after application to the background to be plastered (e.g. a wall), can be very easily smoothed or processed in another desired manner and, moreover, set very uniformly. When used as a plastering mortar to be sprayed, an improved slidability of the mortar compositions in the tubes of the spraying devices becomes apparent.

Also the salts of sulfuric acid esters mentioned above under b) have some of the above-mentioned advantages; in particular they, too, cause aqueous plaster compositions to form many relatively stable air voids.

The invention will be further illustrated by reference to the following specific examples:

EXAMPLE 1

A mixture of
- 1,000 parts by weight of calcined gypsum,
- 700 parts by weight of water, and
- 0.75 part by weight of sodium salt of $\alpha$-olefin sulfonate (from an $\alpha$-olefin mixture with 14 to 20 carbon atoms)

is thoroughly kneaded in a mixing apparatus as is used for testing cements for mixing mortar mixtures. The mixing apparatus used, which can be operated at two different speeds, is operated for 30 seconds at low rpm and for 30 seconds at high rpm. During the mixing of the composition, air is included therein. The thus foamed composition is cast into prism molds of 4 × 4 × 16 cm. After hardening (1 hour) the prisms are taken from the mold and stored for 7 days at 20°C. and 65% relative air humidity. The prisms are then dried in a drying cabinet at 40°C. to constant weight.

To judge the efficiency of the $\alpha$-olefin sulfonate, the weight of the prism is determined; it is 1.20 g per cm$^3$.

When repeating the example but, instead of the $\alpha$-olefin sulfonate, with the use of lauryl pyridinium laurate or tallow propylene diamine oleate in the same quantity, the prism obtained has a weight of 1.46 or 1.45 g, respectively, per cm$^3$.

In the case of a plaster body produced in the same manner but without a forming agent, the density is 1.45 g per cm³.

EXAMPLE 2

The procedure is the same as in Example 1 but, instead of the α-olefin sulfonate, there is used the sodium salt of a sulfuric acid ester of an alkyl polyglycol ether (of a fatty alcohol of a chain length of 10 to 14 carbon atoms and etherified on an average with 3 moles of ethylene oxide). The density of the plaster body obtained is 0.95 g per cm³.

EXAMPLE 3

The procedure is the same as in Example 1 but, instead of 0.75 part by weight of the α-olefin sulfonate, there are used 1.5 parts by weight of a mixture of
- 15 per cent by weight of α-olefin sulfonate as in Example 1,
- 20 per cent by weight of alkyl polyglycol ether sulfate as in Example 2,
- 10 per cent by weight of fatty acid methyl tauride,
- 5 per cent by weight of dodecyl alcohol,
- 8 per cent by weight of butyl diglycol, and
- 42 per cent by weight of water.

The density of the plaster body obtained is 0.80 g per cm³.

EXAMPLE 4

The procedure is the same as in Example 1 but, instead of 0.75 part by weight of the α-olefin sulfonate, there are used 2.0 parts by weight of a mixture of
- 20 per cent by weight of α-olefin sulfonate as in Example 1,
- 6.6 per cent by weight of fatty acid sarcoside,
- 2.4 per cent by weight of monoethanolamide polyglycol ether of the acid of coconut oil,
- 0.5 per cent by weight of dodecyl alcohol,
- 2.0 per cent by weight of sodium pyrophosphate,
- 0.2 per cent by weight of formaldehyde, and
- 68.3 per cent by weight of water.

The density of the plaster body obtained is 1.10 g per cm³.

EXAMPLE 5

A plaster mortar consisting of
- 70 parts by weight of calcined gypsum,
- 5 parts by weight of hydrated lime,
- 23 parts by weight of limestone sand or quartz sand,
- 2 parts by weight of perlite,
- 0.05 part by weight of α-olefin sulfonate as in Example 1, of a particle size below 0.2 mm,
- 0.2 part by weight of methyl cellulose (viscosity of the 2 per cent by weight of solution in water at 20°C. is 4,000 cp.), and
- 0.2 part by weight of plaster setting retarder is intensely mixed with water using a commercial plastering machine and sprayed onto a background to be plastered. During mixing with water, air is stirred into the plastering composition. Due to the content of α-olefin sulfonate, a large part of the air stirred in is maintained for a substantial period as small foam pores. Due to this, the plastering composition applied is porous, which becomes apparent when the plastering composition is sprayed in that the application proceeds very smoothly. The porous plastering composition applied also easily can be further processed, e.g. smoothed.

EXAMPLE 6

A dry mortar of cement and lime of the composition

- 150 parts by weight of portland cement,
- 100 parts by weight of hydrated lime,
- 750 parts by weight of limestone sand and quartz sand up to a particle size of 0.8 mm.,
- 10 parts by weight of asbestos fibers,
- 2.5 parts by weight of methyl cellulose, a 2 per cent solution of which in water has a viscosity of about 10,000 cp., and
- 0.3 part by weight of α-olefin sulfonate as in Example 1 is mixed with the desired quantity of water in a plastering machine used in the building trade, and hitherto used only for mortar of plaster and mortar of plaster and lime, to produce a sprayable mortar mixture and immediately thereafter sprayed from a spraying nozzle (spray gun). The sprayed composition is collected and its weight per liter is determined. It is about 10 per cent inferior to that of a spraying mortar mixture prepared in the same manner but without the content of α-olefin sulfonate.

By the use of the α-olefin sulfonate, it is rendered possible for the first time to use a cement mortar in the spraying process.

The lower liter weight furthermore means that, by the use of the α-olefin sulfonate with a certain quantity of mortar, it is possible to plaster an area which is 10 per cent larger than without its use.

EXAMPLE 7

To a typical mixture, for the production of cellular concrete, of
- 70 parts by weight of sand up to a particle size of 0.8 mm,
- 20 parts by weight of quicklime,
- 10 parts by weight of portland cement, and
- 0.10 part by weight of aluminum powder, there is added
- 0.04 part by weight of α-olefin sulfonate (as in Example 3), and
- 0.05 part by weight of a foam stabilizer, e.g. hydroxyethyl cellulose.

By these additions, particularly great heights of rise above 1 m are achieved, i.e. the building material mixture is pressed up and 1 m without collapsing. There are limits, however, resulting from the simultaneous strength decrease of the finished building material.

Instead of hydroxyethyl cellulose, it is possible in this example to use the above-mentioned foam stabilizers or other cellulose ethers, such as methyl cellulose, methyl hydroxyethyl cellulose and methyl hydroxypropyl cellulose as foam stabilizers. The cellulose ethers are employed in a quantity of 0.01 to 0.5 per cent by weight, calculated on the dry weight of the cement-containing composition. Furthermore, there can be used a number of synthetic polymers, such as polyacrylamide, partially saponified polyacrylamide, polyacrylates, methyl, ethyl, and propyl esters of the polyacrylic acid or mixtures of these products. Polyacrylamide and particularly partially saponified polyacrylamide have proved particularly advantageous since it is possible therewith to achieve an extraordinarily stiff foam. They are employed in a quantity of 0.001 to 0.1 per cent by weight, calculated on the dry weight of the cement-containing composition.

EXAMPLE 8

The preparation of a porous prism of gypsum with the use of the sodium salt of α-olefin sulfonate as a foaming agent as described in the above Example 1 was repeated with the exception that another kind of gypsum was used. For comparison, porous prisms of gypsum were prepared from the same other kind of gypsum, but with the use of the sodium salts of diisobutyl naphthalene sulfonate, of a petroleum sulfonate, and of dodecyl sulfonate as a foaming agent, and without the use of a foaming agent. The specific weight of the prisms in grams per cm³ were:

| sodium salt of | g/cm³ |
|---|---|
| α-olefin sulfonate | 1.03 |
| diisobutyl naphthalene sulfonate | 1.06 |
| petroleum sulfonate | 1.09 |
| dodecyl sulfonate | 1.07 |
| without foaming agent | 1.10 |

EXAMPLE 9

The preparation of a porous prism of gypsum with the use of a mixture of the sodium salt of α-olefin sulfonate and of the sodium salt of a sulfuric acid ester of an alkyl polyglycol ether as a foaming agent as described in the above Example 3 was repeated with the exception that the kind of calcinated gypsum used in the above Example 8 was used.

The weight of the porous prism of gypsum was 0.80 g per cm³.

It will be obvious to those skilled in the art that many modifications may be made within the scope of the present invention without departing from the spirit thereof, and the invention includes all such modifications.

What is claimed is:

1. A foamable composition comprising water, calcined gypsum or hydraulic cement and, as a foaming agent, about 0.01 to 5 parts by weight per 100 parts by weight of calcined gypsum or hydraulic cement, of the sodium salt of an α-olefin sulfonate of an olefin having 14 to 20 carbon atoms in the molecule.

2. A foamable composition comprising water, calcined gypsum and hydraulic cement and, as a foaming agent, an α-olefin sulfonate of an olefin having 14 to 20 carbon atoms in the molecule blended with up to 2 parts by weight per part by weight of said α-olefin sulfonate, of the sodium salt of the sulfuric acid ester of an alkyl polyglycol ether, which is prepared by hydroxyethylation of one mole of a fatty alcohol having a carbon chain of 10 to 14 carbon atoms with, on the average, 3 moles of ethylene oxide, said blended foaming agent being present in a quantity of about 0.01 to 5 parts by weight per 100 parts by weight of calcined gypsum or hydraulic cement.

* * * * *